United States Patent
Wagenblast et al.

(10) Patent No.: US 10,739,191 B2
(45) Date of Patent: Aug. 11, 2020

(54) DETERMINING A BEAM PROFILE OF A LASER BEAM

(71) Applicant: TRUMPF Laser- und Systemtechnik GmbH, Ditzingen (DE)

(72) Inventors: Philipp Wagenblast, Leonberg (DE); Matthias Allenberg-Rabe, Stuttgart (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 16/407,283

(22) Filed: May 9, 2019

(65) Prior Publication Data

US 2019/0265100 A1  Aug. 29, 2019

Related U.S. Application Data

(63) Continuation of application No. PCT/EP2017/078810, filed on Nov. 9, 2017.

(30) Foreign Application Priority Data

Nov. 11, 2016  (DE) .................. 10 2016 222 187

(51) Int. Cl.
 *G01J 1/42* (2006.01)
 *B29C 64/153* (2017.01)
 (Continued)

(52) U.S. Cl.
 CPC .......... *G01J 1/4257* (2013.01); *B22F 3/1055* (2013.01); *B29C 64/153* (2017.08); (Continued)

(58) Field of Classification Search
 CPC ...................................................... G01J 1/4257
 (Continued)

(56) References Cited

U.S. PATENT DOCUMENTS

| 5,085,509 A | 2/1992 | Gaffard et al. |
| 7,477,402 B2 * | 1/2009 | Babayoff ........... A61B 1/00096 356/609 |

(Continued)

FOREIGN PATENT DOCUMENTS

| DE | 102012100721 | 4/2013 | ............ B23K 26/04 |
| DE | 102015001421 | 8/2016 | ............... G01J 1/02 |

(Continued)

OTHER PUBLICATIONS

The International Search Report and Written Opinion for International Application No. PCT/EP2017/078810 dated Feb. 23, 2018.

(Continued)

*Primary Examiner* — Tarifur R Chowdhury
*Assistant Examiner* — Omar H Nixon
(74) *Attorney, Agent, or Firm* — Fish & Richardson P.C.

(57) ABSTRACT

The present disclosure relates to a method for determining a beam profile of a laser beam, which is positioned by a scanner device in a processing field. The method includes: arranging at least one retroreflector in the processing field for irradiating powder layers of the scanner device; detecting laser radiation reflected back into the scanner device while the laser beam is scanned over the retroreflector; and determining the beam profile of the laser beam by using the laser radiation detected during the scanning travel over the retroreflector.

17 Claims, 2 Drawing Sheets

(51) Int. Cl.
   *B29C 64/268*    (2017.01)
   *G01J 1/04*      (2006.01)
   *G01J 1/44*      (2006.01)
   *G02B 5/126*     (2006.01)
   *G01B 11/00*     (2006.01)
   *B33Y 30/00*     (2015.01)
   *B22F 3/105*     (2006.01)
   *B33Y 10/00*     (2015.01)
   *B33Y 50/02*     (2015.01)

(52) U.S. Cl.
   CPC ............ *B29C 64/268* (2017.08); *B33Y 30/00* (2014.12); *G01B 11/00* (2013.01); *G01J 1/0407* (2013.01); *G01J 1/44* (2013.01); *G02B 5/126* (2013.01); *B22F 2003/1056* (2013.01); *B22F 2003/1057* (2013.01); *B22F 2999/00* (2013.01); *B33Y 10/00* (2014.12); *B33Y 50/02* (2014.12); *G01J 2001/446* (2013.01); *Y02P 10/295* (2015.11)

(58) Field of Classification Search
   USPC ........................................................ 356/121
   See application file for complete search history.

(56) References Cited

U.S. PATENT DOCUMENTS

| | | | |
|---|---|---|---|
| 2006/0001739 A1* | 1/2006 | Babayoff | A61B 1/0676 348/49 |
| 2007/0109559 A1* | 5/2007 | Babayoff | A61B 5/0064 356/609 |
| 2008/0309949 A1* | 12/2008 | Rueb | G01C 15/002 356/614 |
| 2009/0002687 A1 | 1/2009 | Wenzel | |
| 2009/0201514 A1 | 8/2009 | Sato | |
| 2010/0176539 A1 | 7/2010 | Higashi et al. | |
| 2012/0168605 A1* | 7/2012 | Milanovic | G01B 11/002 250/203.1 |
| 2012/0242994 A1* | 9/2012 | Huber | G01B 11/026 356/450 |
| 2013/0256517 A1 | 10/2013 | Babayoff et al. | |
| 2015/0346330 A1 | 12/2015 | Markendorf | |
| 2016/0016360 A1* | 1/2016 | Voris | D01F 6/28 264/129 |
| 2016/0082668 A1 | 3/2016 | Perret et al. | |
| 2016/0096236 A1* | 4/2016 | Cho | G01J 5/0806 219/76.12 |
| 2017/0014905 A1* | 1/2017 | Kawada | B29C 64/20 |
| 2017/0186143 A1 | 1/2017 | Ohno et al. | |
| 2017/0144248 A1* | 5/2017 | Yoshimura | B29C 64/153 |
| 2018/0029164 A1 | 2/2018 | Kramer et al. | |

FOREIGN PATENT DOCUMENTS

| | | | |
|---|---|---|---|
| EP | 0 331 962 | 9/1989 | ............ B23K 26/04 |
| JP | H 2-38931 | 2/1990 | ............ G01J 1/02 |
| JP | WO2016/151712 | 9/2016 | ............ B29C 67/00 |
| WO | WO 2016/085334 | 6/2016 | ............ B29C 67/00 |

OTHER PUBLICATIONS

The German Office Action for German Application No. DE 10 2016 222 187.6 dated Sep. 7, 2017.

\* cited by examiner

DETERMINING A BEAM PROFILE OF A LASER BEAM

CROSS REFERENCE TO RELATED APPLICATIONS

This application is a continuation of and claims priority under 35 U.S.C. § 120 from PCT Application No. PCT/EP2017/078810 filed on Nov. 9, 2017, which claims priority from German Application No. DE 10 2016 222 187.6, filed on Nov. 11, 2016. The entire contents of each of these priority applications are incorporated herein by reference.

TECHNICAL FIELD

The present disclosure relates to methods for determining a beam profile of a laser beam, which is positioned in a processing field by a scanner device. The disclosure also relates to processing machines for producing three-dimensional components by irradiating powder layers.

BACKGROUND

It may be advantageous for laser processing to determine or to know precisely the beam profile of a laser beam, e.g., the position-dependent intensity distribution or power distribution of the laser beam perpendicular to the direction of propagation of the laser beam. For example, it can be advantageous to know the beam profile at or near a processing plane, in which the laser beam is typically focused for the processing. A workpiece may, for example, be arranged in or near the processing plane in a laser processing machine or a powder layer to be irradiated may be arranged in a processing machine for producing three-dimensional components. In the case of a powder material, a laser beam in such a processing machine is focused on a layer of the powder material, typically in the form of a metal powder, so the powder material fuses locally to produce a layer of the three-dimensional component ("laser metal fusion", LMF).

Ensuring an optimally stable process requires that the scanner device or an irradiation device having such a scanner device provide a defined, reproducible beam profile (laser spot) in the powder bed or on the powder layer irradiated by means of the laser beam. For this purpose, the beam profile may be carried out upon or during the start-up of the processing machine with the aid of a special measuring device, which is introduced into the processing device near the processing plane. Since the processing chamber is normally inaccessible from the outside, the time invested in assembling and disassembling the measuring unit, as well as in the actual measurement, is considerable and may amount to several hours. Since the measuring unit requires considerable installation space, it is also not possible to carry out the determination of the beam profile during the operation of the processing machine.

A device for measuring the intensity profile of a laser beam, which has a semi-transparent deflection mirror arranged in the beam path of the laser beam for coupling a small portion of the radiated power of the laser beam out to a spatially-resolving detector, has become known from JP H02-038931 A. A deflection mirror, which is already provided in the beam path for deflecting the beam, is preferably used for such purpose.

A device for determining geometric parameters of a laser beam, which comprises a beam diagnostic device and an optical system designed to focus a laser beam in a processing area, is described in DE 10 2015 001 421 A1. A reflector element is positionable in a positioning area between the optical system and the processing area and includes a first semi-reflective surface, the first surface being curved and the curvature of the first surface being identical to an average curvature of a wave front of the laser beam focused by the optical system in the positioning area of the reflector element. The reflector element may be an optical lens having a spherical surface, for example, a plano-convex lens or a concentric meniscus lens. The beam diagnostic device may comprise a device for focusing coupled-out radiation and a spatially resolving sensor.

SUMMARY

The object of the present disclosure is to provide methods, which enable a simple and rapid determination of the beam profile of a laser beam for the aforementioned processing.

In general, in some aspects, the subject matter of the present disclosure is encompassed in methods, which comprise: arranging at least one retroreflector in a processing field of a scanner device, in which the processing field may be formed in a processing chamber for irradiating powder layers; detecting laser radiation, which is reflected back into the scanner device as the laser beam is passed over the retroreflector in a scanning manner; and determining the beam profile of the laser beam by using the laser radiation detected as the retroreflector is passed over in a scanning manner.

To determine the beam profile in the processing field of the scanner device, the present disclosure proposes to use a retroreflector, e.g. a reflecting material or a reflecting object, which reflects back a significant portion of the intensity of the incident laser beam essentially independently of the angle of incidence to the beam source to the scanner device. The retroreflector may have a reflectivity of at least 4%, optionally of at least 5% in the direction of incidence of the laser beam over a large angle of incidence range of, for example, between 65° and approximately 115°, e.g., at an angle of incidence deviating by up to approximately +/−25° from a vertical incidence on the retroreflector. The reflectivity of the retroreflector in the direction of incidence is therefore significantly greater than in conventional reflecting objects or materials, in which the incident radiation is specularly reflected, so that only a very small portion of scattered laser radiation is reflected back in the direction of incidence of the laser beam. The increased intensity of the laser radiation reflected from the retroreflector back to the scanner device increases the detectability and, therefore, the precision in the determination of the beam profile of the laser beam.

The intensity of the retro-reflected laser beam that strikes the detector is a function, for example, of the refractive index of the reflector material used, as is described in greater detail below. This material may be tailored to the power of the laser beam striking the retroreflector, as well as to the permeability of optical elements that are arranged between the retroreflector and a detector for detecting the retro-reflected laser beam, in such a way that the measuring range of the detector or of its sensitivity is optimally utilized. The design of the optical properties of an output coupling element for coupling out the retro-reflected laser beam from the beam path of the laser beam which, for example, may be a semi-transparent mirror, is particularly relevant in this case.

In a scanner device, which is used in a processing machine for producing three-dimensional components, the processing field of the scanner device is located in a processing chamber, in which a powder material is also located. A focusing device focuses the laser beam in a processing plane, in which the processing field is formed. A respective powder layer, which is irradiated by the laser beam in order to produce a layer of the three-dimensional component, is typically located in the processing plane. The retroreflector may be introduced manually into the processing chamber for determining the beam profile and may be arranged in the processing field, specifically, typically on or near the processing plane. The retroreflector may optionally also be arranged permanently in the processing field, for example, by mounting or attaching the retroreflector at the edge of the processing field.

If a non-spatially-resolving detector is used for detecting the laser beam reflected back to the scanner device, then each angular position of the scanner mirror of the scanner device and, therefore, each incident position of the laser beam on the retroreflector may be assigned a signal level or intensity value. In this way, the (e.g., one-dimensional) beam profile or the intensity distribution along the scan direction, in which the laser beam is passed over the retroreflector in a scanning manner, may be determined during a single scanning pass over the retroreflector. The passing of the laser beam in a scanning manner over the retroreflector generally occurs along a predefined constant scan direction in order to determine the beam profile of the laser beam along this scan direction. The determination of the beam profile along a single direction may be sufficient, since the beam profile of the laser beam generally exhibits an essentially rotationally symmetrical intensity distribution about the central axis of the laser beam.

In one advantageous variant, the retroreflector is arranged in an automated manner (i.e., in a manner in which a user does not direct movement of the retroreflector) in the processing field of the scanner device. For this purpose, the retroreflector may be mounted on a moveable device, which is moved into the processing field in order to carry out the determination of the beam profile, and which is removed from the processing field again in order to carry out the irradiation of powder layers for producing the three-dimensional component. A displaceable or movable component, which is already provided, for example, for automations or the like in the processing chamber, may be used for the automated movement. The component may be a pivotable and/or moveable arm, which moves the retroreflector into and out of the processing field.

In one variation, the retroreflector is moved on a movable device for applying powder layers in or at least near the processing field of the scanner device. Typically, a device is located in the processing chamber, which applies a thin powder layer to a powder bed, into which the already finished part of the three-dimensional component is embedded. To apply a respective powder layer, the device is moved at least partly into the processing field of the scanner device, for example, in a linear movement, in order to transport the powder material. The device may, for example, be an arm having a slider or a roller, which transports powder material from a reservoir to the carrier or to the powder bed arranged above the carrier. The arm may be height-adjustable, for example, by a linear movement in the Z-direction, so that after the application, the arm may be moved over the power layer without touching the latter. For this purpose, the arm may also be rotatable about a, for example, horizontally extending rotation axis.

In this way, the device for applying powder layers already present in the processing machine may also be utilized to arrange the retroreflector in the processing field. The retroreflector is generally immovably arranged when the laser beam passes over in a scanning manner, e.g., the movement of the device for applying the powder layers is stopped during the determination of the beam profile or when the laser beam passes over in a scanning manner. This is not absolutely necessary, however, e.g., the retroreflector may optionally also be moved across the processing field even during the determination of the beam profile.

In another variation, the retroreflector is mounted on a carrier for applying the powder layers. The mounting of the retroreflector on the carrier, typically on the top of the carrier, is advantageous, since the carrier is height (e.g., z-direction)-adjustable, so that the carrier may be moved in or near the processing field or the processing plane. Because of the height adjustability of the carrier, it is possible to arrange the retroreflector at respectively different positions in the z-direction in order to measure the beam caustics of the laser beam. Since the powder layers for producing the three-dimensional component are applied to the carrier, the determination of the beam profile by one or of multiple retroreflector(s) mounted on the carrier is, however, generally not possible during the production of the three-dimensional component.

Multiple retroreflectors may be mounted on the carrier or on the device applying the powder layers, in order to determine the beam profile at multiple positions of the processing field. Since the retroreflector or the retroreflectors is/are potentially already moveable along a movement direction of the device on which the retroreflectors are mounted, it is particularly advantageous if multiple retroreflectors are arranged next to one another transversely or perpendicularly to this movement direction. In one device for applying the powder layers, for example, which is movable in the X-direction, multiple retroreflectors may be arranged next to one another in the Y-direction and/or in the Z-direction, in order to be able to carry out a determination of the beam profile even at multiple Y-positions and Z-positions in the processing chamber.

In another implementation, the laser beam is reflected back into the scanner device on a reflector in the form of a three-dimensional object. A three-dimensional object is understood to mean an object that exhibits an expansion in all three spatial dimensions of at least 20 µm, preferably of at least 50 µm, particularly preferably of at least 100 µm, in particular, of at least 1 mm. The extension of the object in the processing field or in the processing plane may be at least as great as the diameter of the laser beam in the processing field, however, the extension or the diameter of the three-dimensional object may also be smaller than the diameter of the laser beam in the processing field, which typically corresponds essentially to the focus diameter, which may, for example, lie between approximately 50 µm and approximately 100 µm. If the extension of the three-dimensional object is less than the diameter of the laser beam, then only a section of the beam profile of the laser beam may be reflected on the three-dimensional object, which typically results in an increase in the resolution when determining the beam profile. In principle, therefore, it is advantageous if the three-dimensional object has a comparatively small extension. Since the laser beam passes over the retroreflector in a scanning manner, the entire beam profile of the laser beam may be determined in this case as well.

In one refinement, the laser beam is reflected on a retroreflector in the form of a ball that is transparent to a wavelength of the incident pilot or process laser beam, which has a diameter of preferably less than 5 mm and/or which is formed preferably of quartz glass or of sapphire.

The retroreflector in this variant is a (e.g., small) transparent ball, which is formed from a material that transmits the laser beam and which typically has a diameter in the range of multiple micrometers to a few millimeters, generally less than 10 mm, preferably less than 5 mm. The diameter of the transparent ball may, for example, be between approximately 0.5 mm and 5 mm, wherein a higher resolution may generally be achieved with smaller diameters of the ball in determining the beam profile than with a larger diameter of the ball. The transparent ball acts as a retroreflector, since the ball reflects a major portion of the light entering from a far remote light source onto a spot behind the rear surface of the ball, wherein the rear surface of the ball acts like a retroreflector as a result of the difference in the index of refraction between the ball and the environment, typically air.

When using a non-spatially-resolving detector, retro-reflected laser radiation is detected by the detector only in a particular angular range, wherein the angular range is superimposed with the direction of incidence and direction of departure of the laser beam on the retroreflector due to the positioning of the detector (generally coaxially to the beam path of the laser beam). Thus, the resolution in the determination of the beam profile when using a ball as a retroreflector, in addition to the size or the diameter of the ball (see above), is also a function of where the focus of the laser radiation penetrating the ball is located: if, due to the index of refraction of the transparent material of the ball, the focus is directly on the rear side of the ball, the laser radiation is largely reflected back in a narrow angular range about the direction of incidence of the laser beam, so that the resolution of the measurement method is comparatively low. If the index of refraction of the ball is greater or less than the value, in which the focus is located directly on the rear side of the ball, so that the laser beam is focused in front of or behind the rear side of the ball, the retro-reflected laser radiation expands slightly so that in each case only a fraction of the retro-reflected laser radiation is detected, which typically enters essentially centrally into the ball, so that the beam profile of the laser beam when passing over in a scanning manner may be determined with a higher resolution.

The index of refraction, in which the focus is approximately on the rear side of the ball, is approximately at n=2.0. The ball is formed preferably of quartz glass ($SiO_2$) or of sapphire ($Al_2O_3$), since both materials exhibit a comparatively low index of refraction, so that the focus of the laser beam in this case is located behind the rear side of the ball. Quartz glass, in particular, which has a comparatively low index of refraction of approximately n=1.54 over a comparatively large wavelength range may be advantageous for carrying out the method. It is understood, however, that other materials, for example, glasses, may also be used as ball materials. Materials that have a comparatively high index of refraction, for example, diamond with n=2.42 may optionally also be used as materials for the ball, since in this case, the focus is in front of the rear side of the ball and the retro-reflected laser radiation is also expanded.

A retroreflector in the form of a transparent ball made, in particular, from the above described materials allows for a very precise determination of the beam profile of the laser beam, since only the portion of the laser beam passing through the center of the ball is reflected directly back into the scanner device. Three-dimensional objects that are designed otherwise, for example, as prisms or the like, may optionally also be used as retroreflectors, but these should be very small in relation to the diameter of the laser beam at the location of the retroreflector, since the effect of the expansion of the angular range of the retro-reflected laser radiation described above, which increases the resolution when determining the beam profile, does not generally occur in such three-dimensional objects.

In one variant of the method, the laser beam is repeatedly passed over the retroreflector in a scanning manner for determining two-dimensionally the beam profile of the laser beam. In order to obtain a completely two-dimensional beam profile of the laser beam, the laser beam may be moved repeatedly with a slight lateral offset over the retroreflector in a scanning manner. With such a line-by-line scanning of the retroreflector, it is possible to record an extensive, two-dimensional intensity distribution of the laser beam.

In another variant, methods disclosed herein also comprise: changing a distance between the retroreflector and the scanner device and/or changing a focus position of the laser beam in the direction of propagation of the laser beam, as well as determining once again the beam profile of the laser beam by detecting laser radiation that is reflected back into the scanner device as the laser beam is passed over the retroreflector in a scanning manner. The beam profile of the laser beam is generally determined one-dimensionally or two-dimensionally in or near the processing plane, which typically corresponds to the focus plane. The beam profile may also be determined at least at one additional distance from the processing plane, in order to determine the beam caustics, e.g., the change in the beam profile in the direction of propagation of the laser beam. When changing the distance between the retroreflector and the scanner device, it may be checked, for example, at what distance from the processing plane the diameter of the beam profile is minimal. The position or the distance from the scanner device at which the beam profile of the laser beam exhibits a minimum diameter corresponds to the focus position of the laser beam. To measure the beam caustics, it is alternatively or also possible to change the focus position of the laser beam in the direction of propagation with the aid of a focusing device, as a result of which the beam profile is changed at the location of the retroreflector or is shifted in the direction of propagation. A change of the beam profile in the direction of propagation of the laser beam may be determined or measured in this way as well.

Another aspect of the present disclosure relates to a processing machine of the aforementioned kind, comprising: an irradiation device having a scanner device for positioning a laser beam in a processing field, a processing chamber, in which the processing field is formed and which includes a carrier for applying the powder layers, at least one retroreflector, which is positionable in the processing field of the scanner device, a detector for detecting laser radiation, which is reflected by the retroreflector back into the scanner device as the laser beam is passed over the retroreflector in a scanning manner, as well as a measurement computer for determining the beam profile of the laser beam using the detected laser radiation.

As previously described above, the processing machine is used to locally fuse a powder bed or a powder layer, which is typically arranged in the processing field of the scanner device in order to produce a layer of the three-dimensional component using so-called "laser metal fusion" (LMF). In addition to the scanner device, the irradiation device generally includes a focusing device, which is used for focusing the laser beam in or near a processing plane. The processing field is delimited by the maximum deflections of the scanner mirror or scanner mirrors of the scanner device. The focusing direction may be adaptively designed in order to change the focus position in the direction of propagation of the laser beam. The irradiation device also includes a laser source, for example, in the form of a fiber laser or of another laser. The determination of the beam profile may be carried out with the aid of the retroreflector, both for a processing laser beam of the laser source, which is used for fusing the powder layers, as well as for a pilot laser beam of a pilot laser source, which typically has significantly less power (and generally a different wavelength) than the processing laser beam.

In one embodiment, the processing machine comprises a movement device for moving the at least one retroreflector into the processing field (and out of the processing field) of the scanner device. The movement device allows the retroreflector to be introduced into the processing field of the scanner device in an automated manner. In this way, it is possible to carry out a determination of the beam profile of the laser beam if necessary, while a three-dimensional component is produced, wherein the processing is briefly interrupted for such purpose. In this way, the beam profile of the laser spot in or near the processing plane on the upper side of the powder bed may be determined in a cost-efficient and fully automated manner. As was previously described above, the beam caustics as well as the focus position or the location of the focus plane of the laser beam may optionally also be determined. All components, with the exception of the retroreflector, which are required for determining the beam profile, are arranged outside the processing chamber, e.g., they are located far removed from the actual measuring position.

The detector may be positioned coaxially to the beam path of the laser beam in the irradiation device, wherein the laser radiation reflected back to the scanner device is coupled out from the beam path of the laser beam via a beam splitter, for example, a partially transmissive deflection mirror. The beam splitter may, for example, have a highly reflective, dielectric coating on which only a small portion of the intensity of the laser radiation is transmitted to the detector (or optionally reflected). The retro-reflected laser radiation is typically focused or imaged on the detector via an imaging device, for example, via a lens. The dielectric coating of the beam splitter may exhibit different reflectivity or transmission for the wavelength of the processing laser beam and for the wavelength of the pilot laser beam, in order to ensure that the respective intensity of the retro-reflected laser radiation striking the detector is in the range of the measuring range of the detector. The dielectric coating may, for example, exhibit a reflectivity of 99.9% for the wavelength of the processing laser beam and a lower reflectivity of, for example, approximately 50% for the wavelength of the pilot laser beam. Accordingly, approximately 0.1% of the intensity of the retro-reflected laser radiation of the processing laser beam is transmitted to the detector, whereas approximately 50% of the intensity of the retro-reflected laser radiation of the pilot laser beam, which generally has significantly less power than the processing laser beam, is transmitted to the detector.

In one refinement, the movement device for moving the at least one retroreflector into the processing field of the scanner device is designed as a device for applying powder layers. The device may, for example, be an arm on which the slider is mounted, in order to convey the powder material to the carrier and to distribute it on the surface thereof or on the powder bed.

In another embodiment, the retroreflector is mounted on a carrier for applying the powder layer. As was previously described above, the carrier is generally movable in the vertical direction, e.g., in z-direction, so that by moving the carrier, the retroreflector may be situated at respectively different positions in the z-direction, in order to measure the beam caustics of the laser beam.

In another embodiment, the retroreflector is designed as a three-dimensional object, preferably as a transparent ball. As was previously described above, the use of a transparent ball as a retroreflector is advantageous, since the transparent ball generally expands the retro-reflected laser radiation somewhat, which has an advantageous effect on the resolution when determining the beam profile.

In another refinement, the transparent ball is formed from quartz glass or sapphire. It is understood that the ball may also be formed from other materials that have a suitable index of refraction, so that the retro-reflected laser radiation is expanded to an angular range so that the beam profile may be detected with a higher resolution.

In another variation, the transparent ball has a diameter of less than 5 mm. As was previously described above, the transparent ball may have a diameter in the range of multiple micrometers, for example, 20 μm up to a few millimeters, generally, less than 10 mm, preferably of less than 5 mm.

In another embodiment, the detector is designed as a (e.g., photo) diode, e.g., the detector is not a spatially-resolving detector. The detection of the intensity of the laser beam reflected back to the scanner device by a non-spatially-resolving detector is sufficient, since the position of the laser beam in the processing field may be varied with the aid of a scanner device. A detector in the form of a diode may already be available in the processing machine for process monitoring during the production of the three-dimensional component, so that the detector may also be advantageously used for determining the beam profile of the laser beam. A (e.g., photo) diode generally has a measurement range for the power of the incident (e.g., laser) radiation, which is in the mW range, wherein enhanced measurement diodes may also measure the power of the incident radiation in the range of μW. As was previously described above, the properties of a beam splitter, which is used for coupling out the retro-reflected laser radiation, may, for example, be adapted to the measurement range of the diode, in order to optimally utilize its sensitivity.

BRIEF DESCRIPTION OF THE DRAWINGS

Additional advantages arise from the description and from the drawing. The aforementioned features and still further cited features may each be used alone or multiply in arbitrary combinations. The embodiments shown and described are not to be understood as an exhaustive enumeration, but rather have exemplary character for the description of the invention.

DETAILED DESCRIPTION

Figure 1:
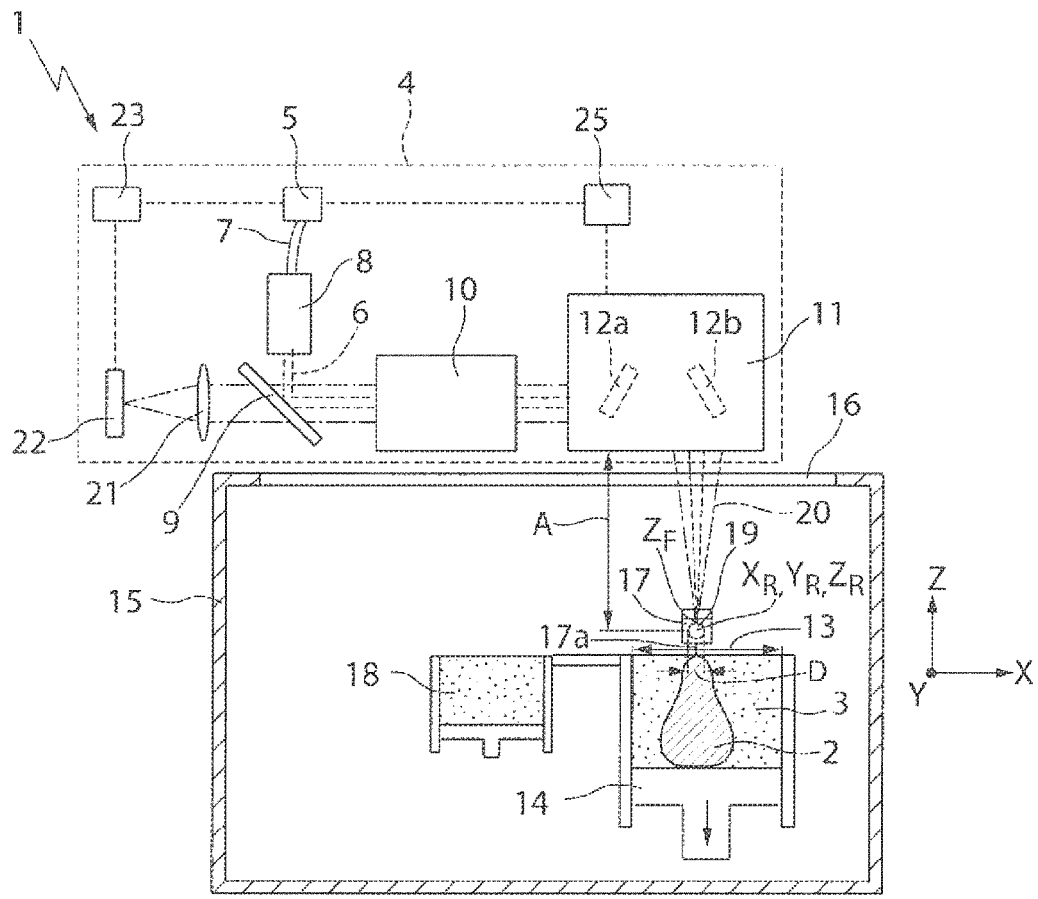
FIG. 1 shows a schematic representation of an exemplary embodiment of a processing machine for producing three-dimensional components, having a retroreflector in the form of a transparent ball for determining the beam profile of a laser beam.

In the following description of the drawings, identical reference numerals are used for identical or functionally identical components.

FIG. 1 shows an exemplary structure of a processing machine 1 for producing a three-dimensional component 2 by irradiating powder layers 3, which are arranged one on top of the other in the example shown in FIG. 1 and which form a powder bed, in which the three-dimensional component 2 is embedded. The processing machine 1 includes an irradiation device 4, which includes a laser source 5 in the form of a fiber laser for generating a laser beam 6, which is guided to a deflection mirror 9 via an optical cable 7 and a collimation device 8. The laser beam 6 in the example shown is a high-power processing laser beam, which is used for the irradiation or local fusing of the powder layers 3. The laser beam 6 may alternatively be a pilot laser beam, which is also generated by the laser source 5 in the form of the fiber laser. The processing laser beam 6 in the example shown has a wavelength that differs from the wavelength of the pilot laser beam. The deflection mirror 9 in the example shown in FIG. 1 has a dielectric coating, which is applied to a plate-shaped quartz glass substrate, and which has a reflectivity of more than approximately 99.9% for the wavelength of the processing laser beam 6 and a reflectivity of approximately 30% to approximately 80% for the wavelength of the pilot laser beam, so that the processing laser beam 6 on the deflection mirror 9 is deflected essentially completely to a focusing device 10 of the irradiation device 4.

Downstream from the focusing device 10, the laser beam 6 passes through a scanner device 11, which includes two scanner mirrors 12a, 12b in the form of galvanometer mirrors. The scanner device 11 is used to position the laser beam 6 in a processing field 13 of the scanner device 11, the expansion of which in the example shown in FIG. 1 corresponds essentially to the lateral extension of the powder bed or of the powder layers 3. The processing field 13 is delimited by the maximum deflection of the two scanner mirrors 12a, 12b. The processing field 13 is formed in or near a processing plane in the form of a XY plane of an XYZ coordinate system, in which the uppermost of the powder layers 3 or the upper side of the powder bed is located. The focusing device 10 is used to focus the laser beam 6 in the processing plane.

As is also apparent in FIG. 1, the powder layers 3 are applied to a carrier 14 in the form of a base plate movable in the z-direction. The carrier 14 is arranged in a processing chamber 15 with a window 16, through which the laser beam 6 is radiated into the processing chamber 15. Since the processing field 13 of the scanner device 11, in which the powder material is fused, remains at a constant distance to the scanner device 11 during the production of the three-dimensional component 2, the carrier 14, in order to apply a new powder layer 3, is lowered by the thickness of one powder layer 3, as is indicated by an arrow in FIG. 1.

New powder material is removed from a powder reservoir 18 also arranged in the processing chamber 15 with the aid of a device 17 for applying (new) powder layers 3. The device 17 for applying new powder layers 3 is designed in the example shown in FIG. 1 in the form of a moveable arm, on the underside of which a slider 17a is attached or retained, in order to transport powder material from the powder reservoir 18 into the area of the powder layers 3 or to the upper side of the powder bed, which is located above the carrier 14 in the construction cylinder surrounding the powder layers.

In the example shown in FIG. 1, a reflector 19 in the form of a three-dimensional object, more precisely a transparent ball made of quartz glass, is mounted on a slightly inclined surface on the upper side of the device 17 designed as a movable arm for applying the powder layers 3, which extends in the Y-direction in the example shown, i.e., perpendicular to the drawing plane. It is understood that the retroreflector 19 may also be mounted on or fastened to the arm at another point. The retroreflector ball 19 may alternatively also be formed from another transparent material, for example, from another type of glass, from sapphire or from diamond. The retroreflector ball 19 in the example shown has a diameter D of approximately 2 mm and reflects laser radiation 20 making up a portion of approximately 4-5% of the intensity of the laser beam 6 back into the scanner device 11. A higher reflectivity of the retroreflector ball 19 of significantly more than 5% is potentially disadvantageous, since this may result in an undesired heating of the retroreflector ball 19 or possibly of the scanner device 11. The diameter D of the retroreflector ball 19 need not necessarily be in the range of several millimeters, but may, for example, be between 0.5 m and 5 mm, wherein the diameter D may also be smaller and may be in the range of micrometers, generally at 20 μm or above.

In the example shown in FIG. 1, the laser beam 6 strikes the retroreflector 19 essentially perpendicular to the XY plane, in which the respective powder layers 3 also run, however, it is understood that on the retroreflector 19, a significant amount of radiation of the laser beam 6 of typically more than approximately 4% is also reflected back to the scanner device 11 in a direction of incidence of the laser beam 6 deviating from a vertical incidence. The intensity of the retro-reflected laser radiation 20 is essentially independent of the angle of incidence in the structure shown in FIG. 1, which deviates from the vertical incidence over the entire processing field 13, for example, by approximately +/−25°, wherein the maximum deviation from the vertical incidence occurs at the edge of the processing field 13.

The retro-reflected laser radiation 20 passes through the scanner device 11 and through the focusing device 10 in the direction opposite to the laser beam 6 and strikes the deflection mirror 9. A small portion of approximately 0.1% of the retro-reflected laser radiation 20 is transmitted on the deflection mirror 9, and is imaged or focused on a detector 22 in the form of a photodiode with the aid of an imaging device 21, which is designed as a lens in the example shown in FIG. 1. The detector 22 or the photodiode is arranged coaxially to the beam path of the laser beam 6 or in the extension of the beam path of the laser beam 6. In the example shown, the (processing) laser beam 6 has comparatively low power of approximately 50 W, of which approximately 5%, i.e., approximately 1 W is reflected back on the retroreflector 19. A power percentage of approximately 0.1% of the retro-reflected laser radiation 20, e.g., approximately 1 mW is transmitted on the deflection mirror 9 and strikes the detector 22. The power in the range of mW corresponds approximately to the measurement range of the photodiode. The pilot laser beam has significantly less power, of which, however, a comparatively larger percentage of approximately 50% is transmitted on the deflection mirror 9, so that in this case as well, the power detected by the detector 22 is in the mW range and thus in the measurement range of the photodiode.

The laser beam 6 in the example shown in FIG. 1 is moved over the retroreflector 19 along a scan direction that coincides with the X-direction, e.g., the laser beam 6 passes over the retroreflector 19 in a scanning movement in the X-direction. The detector 22 detects the intensity I of the laser radiation 20, which is hereby reflected back into the scanner device 11 by the retro-reflector ball 19.

Figure 2A:
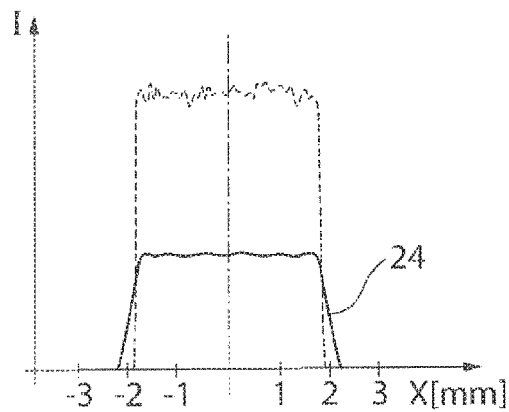
FIGS. 2A and 2B are plots showing exemplary representations of a top-hat beam profile and a Gaussian beam profile, respectively, as well as an associated intensity distribution of laser radiation, which has been reflected back into a scanner device as the laser radiation is passed over a retroreflector of FIG. 1 in a scanning manner.

FIG. 2A shows a beam profile 24 of the laser beam 6 in the X-direction, which has been determined or recorded by an evaluation unit in the form of a measurement computer 23 (e.g., a computing unit coupled with a non-transitory computer-readable medium encoding instructions that cause the computing unit to determine the beam profile 24) connected to the detector 22 as the retroreflector ball 19 was passed over in a scanning manner. As is apparent in FIG. 2A, the beam profile 24 determined with the aid of the detector 22 or with the aid of the computer 23 corresponds essentially to the intensity distribution of the laser beam 6 depicted with a solid line in the area of the processing plane, which has been determined by means of a calculation or of a numerical simulation.

Figure 2B:
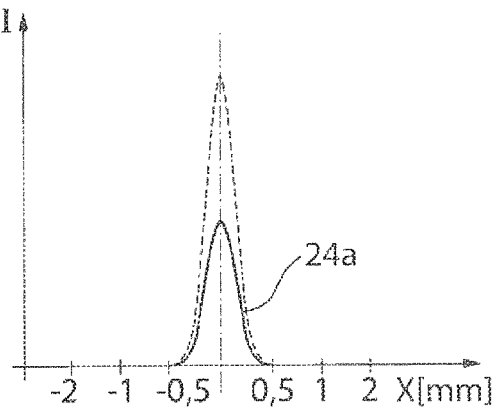

FIG. 2B shows a representation similar to FIG. 2A, in which a laser beam 6 having a Gaussian beam profile has been passed over the retroreflector ball 19 in a scanning manner. As is apparent in FIG. 2B, a Gaussian beam profile 24a, which is approximately proportional to the intensity distribution of the laser beam 6 in the processing plane also depicted in FIG. 2B, is determined with the aid of the detector 22 or with the aid of the measurement computer 23.

As is apparent based on FIGS. 2A and 2B, the respective beam profile 24, 24a of the laser beam 6, which has been determined with the aid of the retro-reflected laser beam 20, matches very precisely the top-hat or Gaussian beam profile set or predefined in the laser source 5. With the aid of the retroreflector ball 19, it is therefore possible to determine the beam profile 24, 24a of the laser beam 6 with high accuracy.

To determine or record the entire two-dimensional Gaussian beam profile 24a of the laser beam 6, the laser beam 6 may pass repeatedly over the retroreflector 19 in a scanning manner in the X-direction, wherein with each scan the laser beam 6 is offset laterally by the same amount in the X-direction, so that the retroreflector ball is scanned line-by-line in the X-direction. A control device 25 is provided in the irradiation device 4 for controlling the movement of the laser beam 6 over the processing field 13. The control device 25 is used to control the angle settings of the two scanner mirrors 12a,b, in order to position the laser beam 6 at a desired position in the processing field 13 or in the processing plane.

Figure 3:
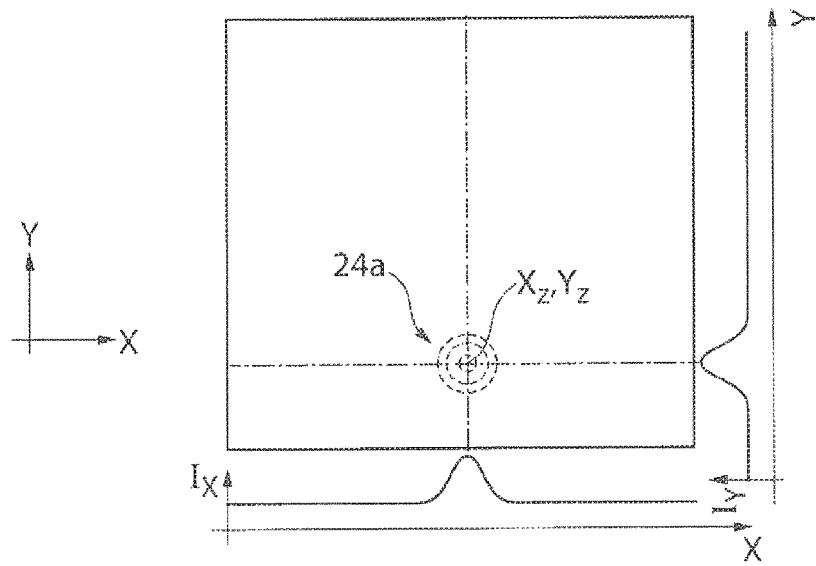
FIG. 3 is an exemplary representation of the elevation lines of a two-dimensional Gaussian beam profile with two Gaussian one-dimensional intensity distributions recorded along two directions perpendicular to one another.

As is apparent in FIG. 3, a two-dimensional intensity distribution or a two-dimensional beam profile 24a is determined in the XY-direction by scanning the retroreflector ball 19, the contour lines of which are depicted in FIG. 3 in the form of concentric circles. Based on the two-dimensional beam profile 24a, it is possible to identify the center position Xz, Yz of the retroreflector ball 19 as the midpoint of the concentric circles and, thus, to determine the position of the beam axis of the laser beam 6. Based on the two-dimensional beam profile 24a shown in FIG. 3, it is also possible to determine a one-dimensional beam profile along an arbitrary direction in the XY plane, for example, the one-dimensional beam profile extending through the center position Xz, Yz in the X-direction and in the Y-direction.

In the example shown in FIG. 1, the distance A between the scanner device 11 and the retroreflector ball 19 or the Z-position ZR of the retroreflector 19 may be changed by a movement of the retroreflector ball 19 in the Z-direction with the aid of the device 17 for applying the powder layers 3. The beam profile 24, 24a of the laser beam 6 may therefore be determined in the above described manner at multiple positions in the Z-direction, so that the beam caustics, e.g., the change of the beam profile 24, 24a of the laser beam 6 in the Z-direction may be determined. By comparing the size or the diameter of multiple beam profiles 24, 24a on different XY-planes in the Z-direction, it is possible to determine the focus position of the laser beam 6 in the Z-direction. The focus position of the laser beam 6 in the Z-direction corresponds in this case to the beam profile 24, 24a, which has a minimal diameter. The change of the beam profile 24, 24a of the laser beam 6 in the Z-direction may also be measured by changing the focus position ZF of the laser beam 6 in the direction of propagation of the laser beam (in the Z-direction in the example shown) with the aid of the focusing device 10.

It is advantageous if the beam profile 24, 24a of the laser beam 6 may be determined at multiple positions in the processing field 13. For this purpose, the retroreflector 19 may be moved, in particular, shifted, in the processing field 13, in order to vary the XY position XR, YR of the retroreflector ball 19. Alternatively or in addition, multiple retroreflectors 19 in the form of three-dimensional objects, for example, in the form of balls that are transparent to a wavelength of the incident pilot or process laser beam, may be attached to the device 17 for applying the powder layers 3, on which the beam profile 24, 24a may be determined in each case.

In the example shown in FIG. 1, the movement axis of the device 17 for transporting powder material extends in the X-direction, so that it is easily possible to change the position XR of the retroreflector ball 19 in the X-direction. In order to record the beam profile 24, 24a at multiple different positions in the processing field 13 in the Y-direction, it is possible to arrange multiple retroreflectors 19 in the form of three dimensional objects, for example, in the form of balls that are transparent to a wavelength of the incident pilot or process laser beam, in the Y-direction spaced apart from one another along the device 17 for applying the powder layers 3. It is equally possible to mount multiple retroreflectors 19 at different positions in the Z-direction to the device 17 for applying the powder layers 3, in order to allow for a measurement of the beam profile 24, 24a at different positions in the Z-direction.

In addition or as an alternative to mounting one or multiple retroreflectors 19 on the device 17 for applying the powder layers 3, the one or multiple retroreflectors 19 may also be mounted at another point in the processing chamber 15, for example, on the carrier 14, more precisely, on the upper side of the carrier 14, generally on the outer edge of the processing field 13. By moving the carrier 14 in the Z-direction, it is possible in this case to also determine the beam profile 24, 24a of the laser beam 6 at different positions in the Z-direction. The beam profile 24, 24a, may also be determined at multiple different positions in the X-direction or in the Y-direction as a result of the arrangement of multiple retroreflectors 19 on the carrier 14.

In summary, the beam profile 24, 24a of the laser beam 6 may be automatically determined in the processing machine 1 described above by mounting a retroreflector 19 on the device 17 for applying the powder layers 3, e.g., with minimal constructional effort. The determination of the beam profile 24, 24a in the manner described above may be carried out within a few seconds without any set-up time, and is therefore suitable to be carried out before, during or after the application of a new powder layer 3 during the production of a three-dimensional component 2. The determination of the beam profile 24, 24a may optionally be carried out during the movement of the device 17 for applying powder layers 3 into the processing field 13 or when moving the device 17 out of the processing field 13. Based on the beam profile 24, 24a determined in the manner described above, it is possible in particular, to also draw conclusions about the condition of the optics used in the irradiation device 4. The control device 25 may, in particular, act on the laser source 5 or optionally on the beam-shaping optical elements (not shown) of the irradiation device 4 in order, if necessary, to correct the beam profile 24, 24a of the laser beam 6 radiated onto the processing field 13 or in order to adapt the beam profile to a desired beam profile.

What is claimed is:

1. A method for determining a beam profile of a laser beam, which is positioned in a processing field by a scanner device, the method comprising:
    arranging at least one retroreflector in the processing field of the scanner device, wherein the processing field is located in a processing chamber for irradiating powder layers;
    detecting laser radiation reflected back into the scanner device as the laser beam is scanned over the retroreflector; and
    determining the beam profile of the laser beam from the detected laser radiation.

2. The method of claim 1, wherein the retroreflector is configured to be moved in the processing field of the scanner device.

3. The method of claim 2, wherein the retroreflector is moved into the processing field of the scanner device on a movable arm that also is configured to apply the powder layers.

4. The method of claim 1, wherein the retroreflector is mounted on a carrier configured to apply the powder layers.

5. The method of claim 1, wherein the laser beam is reflected back into e scanner device from the at least one retroreflector, wherein the at least one retroreflector is a ball.

6. The method of claim 5, wherein the ball is quartz glass or sapphire.

7. The method of claim 1, comprising:
    repeatedly passing the laser beam over the retroreflector in a scanning manner;
    determining a two-dimensional beam profile of the laser beam.

8. The method of claim 1, further comprising:
    changing a distance between the retroreflector and the scanner device and/or changing a focus position in the direction of propagation of the laser beam;
    determining again the beam profile of the laser beam by detecting laser radiation reflected back into the scanner device as the laser beam is scanned over the retroreflector.

9. A processing machine for producing three-dimensional components by irradiating powder layers, the machine comprising:
    an irradiation device comprising a scanner device configured to position a laser beam in a processing field;
    a processing chamber, wherein the processing field is positioned within the processing chamber and wherein the processing chamber comprises a carrier for applying the powder layers and at least one retroreflector, positionable in the processing field of the scanner device;
    a detector arranged to detect laser radiation reflected back into the scanner device as the laser beam is scanned over the retroreflector; and
    a measurement computer configured to determine the beam profile of the laser beam from the detected laser radiation.

10. The processing machine of claim 9, further comprising a movable arm configured to move the at least one retroreflector into the processing field of the scanner device.

11. The processing machine of claim 10, wherein the movement device is further configured to apply the powder layers.

12. The processing machine of claim 9, wherein the retroreflector is mounted on a carrier, and the carrier is configured to apply the powder layers.

13. The processing machine of claim 9, wherein the retroreflector comprises a shape of a ball.

14. The processing machine of claim 13, wherein the ball is quartz glass or sapphire.

15. The processing machine of claim 13, wherein the ball has a diameter of less than 5 mm.

16. The processing machine of claim 13, wherein the ball has a diameter of more than 0.5 mm.

17. The processing machine of claim 9, wherein the detector is a photodiode.

* * * * *